Sept. 9, 1924.
E. H. ARNOLD ET AL
1,507,560
PROCESS AND APPARATUS FOR SYNTHESIZING AMMONIA
Filed Oct. 5, 1921
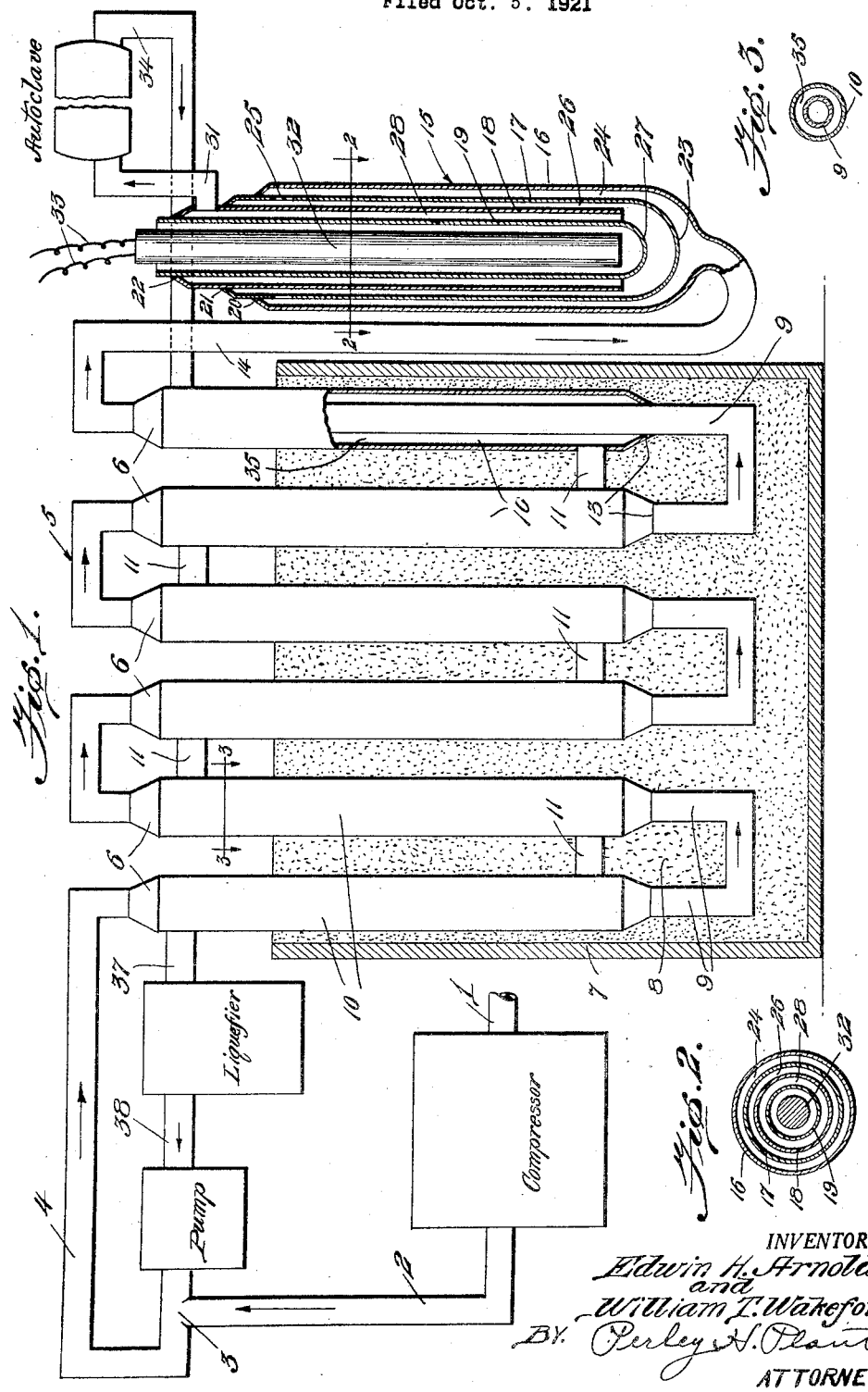
INVENTORS
Edwin H. Arnold
and
William T. Wakeford
BY Perley H. Plant
ATTORNEY Patented Sept. 9, 1924.

UNITED STATES PATENT OFFICE.

EDWIN H. ARNOLD, OF COVENTRY, AND WILLIAM T. WAKEFORD, OF PROVIDENCE, RHODE ISLAND, ASSIGNORS TO THE NITROGEN CORPORATION, OF PROVIDENCE, RHODE ISLAND, A CORPORATION OF RHODE ISLAND.

PROCESS AND APPARATUS FOR SYNTHESIZING AMMONIA.

Application filed October 5, 1921. Serial No. 505,507.

*To all whom it may concern:*

Be it known that we, EDWIN H. ARNOLD and WILLIAM T. WAKEFORD, citizens of the United States, residing at Coventry and Providence, in the counties of Kent and Providence, respectively, and State of Rhode Island, have invented certain new and useful Improvements in Processes and Apparatus for Synthesizing Ammonia, of which the following is a specification.

This invention relates to an improved process and apparatus for synthesizing ammonia, and has among its objects the provision of an improved method of treating the gases to be synthesized whereby the heat of the outgoing gases from the synthesizing chamber is absorbed by the incoming gases in such a manner as to effect a most efficient exchange of heat and at the same time permit such free flow of the gases as will not place an undue strain upon the pumping apparatus employed for circulating the gases through the circulatory system.

Another object of the invention is to provide an apparatus for synthesizing ammonia wherein the heat exchanger and preheater are each provided with unobstructed passages for the passage of the gases, which are substantially equal and uniform in cross-sectional area and also equal in cross-sectional area to the passages connecting the various elements of the circulatory system through which the gases pass in traversing the system.

Another object of the invention is to provide a novel form and arrangement of elements in an apparatus for synthesizing ammonia wherein the gases are so manipulated as to most effectively prepare the same for synthesis whereby a minimum expenditure of energy is required in bringing the incoming gases to the required temperature before entering the synthesizing chamber and in cooling the outgoing gases to separate the ammonia therefrom.

Other objects and advantages of the invention relate to certain improved details of construction and methods of operation as will be more fully set forth in detailed description to follow;

Referring to the drawings:

Fig. 1 is a diagrammatic view of the apparatus,

Fig. 2 is a sectional view taken along the line 2—2 of Fig. 1; and,

Fig. 3 is a sectional view taken along line 3—3 of Fig. 1.

In the synthesis of ammonia by means of the apparatus shown in the accompanying drawings, the gases to be synthesized after being subjected to the necessary purifying operations enter the compressor through the pipe 1, where they are compressed to the desired degree which may be taken for purposes of illustration as approximately 100 atmospheres, although the pressure may be varied somewhat from that point dependent upon the catalyst employed. After being compressed as described the gases pass through the pipe 2 to the main circulatory system of the apparatus which they enter at the point 3 as shown. Upon entering the main circulatory system of the apparatus the gases pass through the pipe 4 to the heat exchanger 5, comprising a series of units 6 which are preferably located in a chamber 7 and surrounded by insulating material 8. While six of these heat exchanger units have been shown in the present instance, it is to be understood that a greater or less number may be employed depending upon the rate of flow of the gases, the superficial area of the heat exchanging surfaces, etc.

The gases entering the heat exchanger from the pipe 4 pass through tubes 9 which are positioned within tubes 10, extending throughout a substantial portion of the lengths of the tubes 9. Each tube 9 is connected at one end to the next adjacent tube, the connections at opposite ends of each tube extending in opposite directions to provide a continuous passage for the gases through the heat exchanger. The tubes 10 which enclose portions of the tubes 9 are each connected at one end to the next adjacent tube 10 by a pipe 11, the connections at opposite ends of each tube extending in opposite directions to provide a continuous passage for the outgoing gases from the synthesizing chamber. Each tube 10 is drawn down at its ends and firmly secured to the outer surface of the enclosed tube 9, preferably by welding, as indicated at 13. From the last tube 9 of the preheater the gases to be synthesized pass through a tube 14 into a preheater designated generally by the numeral 15, which comprises a plurality of concentrically arranged tubes designated by the reference characters 16, 17, 18, and 19. The tube 14 is welded or otherwise firmly secured to the base of the outer tube 16 of the preheater to provide a passage for the gases into the interior of the outer tube.

The tubes 17 and 19 of the preheater are each formed with one end closed for a purpose which will be hereinafter described, and the various tubes are arranged in nested relation to each other, the upper end of the tubes 16, 17 and 18 being drawn down and welded or otherwise firmly secured to the next adjacent tube as indicated respectively by the reference characters 20, 21 and 22.

As the gases enter the base of the outer tube 16, the closed end 23 of the next adjacent tube 17 causes the gases to traverse the annular passage 24 between the tubes 16 and 17 until they reach a point near the top of the tube 16 where openings 25 are formed in the tube 17 to permit the gases to enter the annular passage 26 between the tubes 17 and 18 through which they may pass downwardly beyond the end of the tube 18 where the closed end 27 of the tube 19 causes them to enter the annular passage 28 between the tubes 18 and 19 and pass upwardly therein to a point adjacent the upper end of the tube 18 whence they pass through a pipe 31 into the autoclave or synthesizing chamber. The tube 19 serves as a container for an electric heating element 32 which may be of the usual or any suitable construction and connected by terminals 33 with a source of electric power.

After the gases have been synthesized in the synthesizing chamber or autoclave they pass into a pipe 34 by which they are conducted to one of the pipes 10, preferably the first in the order of their arrangement from the autoclave, and pass downwardly in the tube 10 and outside the tube 9 to the pipe 11 through which they pass to the next succeeding unit of the heat exchanger in which they again traverse a similar annular passage between the tubes 9 and 10, and are similarly transferred to the next unit by means of a similar pipe 11.

From the last preheater unit of the series the outgoing gases pass into a pipe 37 by which they are conducted to the liquefier where the temperature of the gases is further reduced to such a point as to liquefy a substantial portion of the ammonia formed by the synthesis. The gases then pass into a pipe 38 by which they are conducted to a circulating pump which forces these gases into the pipe 4 and again through the circulatory system together with a sufficient supply of fresh gases from the compressor to compensate for the loss in the quantity of gases by reason of the ammonia removed in the liquefier.

As previously stated the gases are maintained under a high pressure in the synthesizing chamber and circulatory system, approximately 100 atmospheres being ordinarily employed, although efficient operation may be obtained with pressures both materially below and materially above that stated, depending largely upon the material used as a catalyst and the rate of flow of the gases. Under the high pressures employed great difficulty has been experienced in devising suitable heat exchange devices and a suitable preheater and in arranging the elements of the system so as to obtain proper circulation of the gases through the system without placing an undue strain upon the pump and at the same time so effect the heat transference between the incoming and outgoing gases to and from the synthesizing chamber that a minimum of heat will have to be added to the incoming gases in the preheater and minimum of heat extracted from the outgoing gases in the liquefier. It will be understood that as the incoming gases to the synthesizing chamber pass from the pipe 4 into the tubes 9 and therethrough to the preheater they take up heat from the outgoing gases passing through the passage 35 of the tubes 10 and thus the temperature of the incoming gases is gradually raised and the temperature of the outgoing gases correspondingly diminished as they pass in opposite directions but in heat exchanging relation with each other through the heat exchanger whereby the incoming gases to the synthesizing chamber reach their highest temperature as they leave the heat exchanger and the outgoing gases from the synthesizing chamber reach their lowest temperature as they emerge from the heat exchanger and pass to the liquefier. Thus by arranging the preheater between the heat exchanger and the synthesizing chamber and the liquefier at a point to receive the outgoing gases on their emergence from the heat exchanger a most efficient heat transference is accomplished and a minimum of heat energy required both in cooling the outgoing gases in the liquefier and in further heating the incoming gases in the preheater.

It has been found that by reason of the high pressure under which it is necessary to operate in synthesizing ammonia great strain is placed upon the pump, and the uniform flow of the gases in the circulatory system at the required velocity is extremely difficult of accomplishment unless certain requirements relative to the size and nature of the passages traversed by the gases are satisfied.

Among the conditions necessary to the most efficient circulation of the gases and the best effectuation of the exchange of heat it has been found that the passages traversed by the incoming and outgoing gases in the heat exchanger should be substantially equal and uniform in cross-sectional area and that these passages should also have a cross-sectional area substantially equal to that of the various pipes connecting the elements of the system such as the liquefier, pump, synthesizing chamber, heat exchanger and preheater. It has also been found that the passages of the preheater to be traversed by the gases should each be of substantially equal and uniform cross-sectional area and also have a cross-sectional area substantially equal to that of the passages of the heat exchanger and the pipes connecting the elements.

The provision of baffle plates or tortuous passages in the heat exchanger, or preheater and the forming of the passages of unequal cross-sectional areas places such a heavy load upon the circulating pump as to prevent the same from maintaining the required circulation of the gases and retards the efficient exchange of heat between the incoming and outgoing gases as well as interfering with the proper feeding of the gases to the synthesizing chamber.

In order to overcome these difficulties it has been found advisable to make the passages through the heat exchanger and preheater as nearly as possible unobstructed by dispensing with baffle plates and tortuous passages and forming the various passages of substantially equal cross-sectional area. For most efficient operation it has been found that the passage in the tube 9 should be substantially equal in cross-sectional area to the passages in the pipes connecting the various elements of the system while the annular passage 35 should be substantially equal to or slightly larger in cross-sectional area than the passage in the tube 9.

The annular passages 24, 26 and 28 in the preheater should be at least equal in cross-sectional area to those of the tubes 9 and may even be made slightly larger.

As an example of the dimensions which we have found it advisable to employ in practice, if pipe one inch in diameter is used for connecting the elements of the system and for forming the tubes 9, the cross-sectional area of the passage 35 may be made equal to that of a pipe having a diameter of 1.1 inches, while the passages 24, 26 and 28 may have cross-sectional areas equal to that of a pipe 1.2 inches in diameter.

It is to be understood that in setting forth the dimensions which we have found it advisable to employ we do not limit ourselves to these precise dimensions or multiples thereof but intend by the term substantially equal cross-sectional areas to cover both the dimensions named and such approximations thereof as may be employed to secure the results accomplished by the present invention.

Having thus described our invention, what we claim is:

1. The process of synthesizing ammonia by continuously passing a mixture of nitrogen and hydrogen gases through a system including a synthesizing chamber and into contact with a catalytic agent contained in said chamber which comprises the bringing of the incoming and outgoing gases to and from the synthesizing chamber into heat exchanging relation by passing them through concentrically arranged passages having substantially the same cross-sectional area, and then further raising the temperature of the incoming gases prior to their entry into the synthesizing chamber by causing the said gases to traverse heated passages having substantially the same cross-sectional area as said concentrically arranged passages.

2. The process of synthesizing ammonia by continuously passing a mixture of nitrogen and hydrogen gases through a system including a synthesizing chamber and into contact with a catalytic agent contained in said chamber which comprises the circulation of the gases in a closed system by bringing the incoming and outgoing gases to and from the synthesizing chamber into heat exchanging relation by passing the same through a heat exchanger having passages of a cross-sectional area which is uniform and substantially equal to that of the passages connecting the various elements of the system, and then further raising the temperature of the incoming gases prior to their admission to the synthesizing chamber.

3. The process of synthesizing ammonia by continuously passing a mixture of nitrogen and hydrogen gases through a system including a synthesizing chamber and into contact with a catalytic agent contained in said chamber which comprises the bringing of the incoming and outgoing gases to and from the synthesizing chamber into heat exchanging relation by passing them through contiguous passages having substantially the same cross-sectional area, further heating the incoming gases after the said gases have been passed into heat exchanging relation with the outgoing gases, and then passing said incoming gases into the synthesizing chamber.

4. The process of synthesizing ammonia by continuously passing a mixture of nitrogen and hydrogen gases through a system including a synthesizing chamber and into contact with a catalytic agent contained in said chamber which comprises the bringing of the incoming and outgoing gases to and from the synthesizing chamber into heat exchanging relation by passing the same through contiguous passages, and then passing the incoming gases through passages the temperature of which is maintained above that of the heat exchanging passages, the cross-sectional area of the various passages being substantially equal.

5. The process of synthesizing ammonia by continuously passing a mixture of nitrogen and hydrogen gases through a system including a synthesizing chamber and into contact with a catalytic agent contained in said chamber which comprises passing the gases through a synthesizing chamber, a heat exchanger, a liquefier and again through the heat exchanger and a preheater to the synthesizing chamber, wherein the passages connecting the various elements and the passages traversed by the gases in passing through the heat exchanger and the preheater are all of substantially the same cross-sectional area.

6. The process of synthesizing ammonia by continuously passing a mixture of nitrogen and hydrogen gases through a system including a synthesizing chamber and into contact with a catalytic agent contained in said chamber which comprises, bringing the incoming and outgoing gases to and from the synthesizing chamber into heat exchanging relation, further raising the temperature of the incoming gases after they have passed heat exchanging relation with the outgoing gases, further lowering the temperature of the outgoing gases after they have passed heat exchanging relation with the incoming gases, and then returning the gases thus cooled to the system to bring the same into heat exchanging relation with a fresh supply of outgoing gases.

7. The process of synthesizing ammonia by continuously passing a mixture of nitrogen and hydrogen gases through a system including a synthesizing chamber and into contact with a catalytic agent contained in said chamber which comprises the bringing of the incoming and outgoing gases to and from the synthesizing chamber into heat exchanging relation and circulating the same at substantially the same velocity in contiguously arranged passages.

8. The process of synthesizing ammonia by continuously passing a mixture of nitrogen and hydrogen gases through a system including a synthesizing chamber and into contact with a catalytic agent contained in said chamber which comprises, bringing the incoming and outgoing gases to and from the synthesizing chamber into heat exchanging relation, and further raising the temperature of the incoming gases after they have passed heat exchanging relation with the outgoing gases and before their entry into the synthesizing chamber.

9. The process of synthesizing ammonia by continuously passing a mixture of nitrogen and hydrogen gases through a system including a synthesizing chamber and into contact with a catalytic agent contained in said chamber which comprises the bringing of the incoming and outgoing gases to and from the synthesizing chamber into heat exchanging relation by passing them while under super-atmospheric pressure through unobstructed contiguous passages having substantially the same cross-sectional area.

10. In an apparatus for synthesizing ammonia a circulatory system for the gases including as elements thereof a synthesizing chamber, a liquefier and a circulating pump together with passages connecting said elements, a heat exchanger having passages formed therein and connected in series with the said synthesizing chamber, liquefier and pump, the passages of said heat exchanger being of substantially the same cross-sectional area as the passages connecting said elements.

11. In an apparatus for synthesizing ammonia, a circulatory system for the gases including as elements thereof a synthesizing chamber, a preheater, a heat exchanger, a liquefier and a circulating pump together with passages connecting said elements, the preheater and heat exchanger being provided with passages for the passage of said gases which are substantially equal in cross-sectional area to the passages connecting said elements.

12. In an apparatus for synthesizing ammonia, a synthesizing chamber, a heat exchanger connected with said synthesizing chamber and provided with passages for the incoming and outgoing gases to and from said synthesizing chamber the said preheater being provided with contiguous passages for the incoming and outgoing gases which are substantially equal and uniform in their cross-sectional areas.

13. In an apparatus for synthesizing ammonia, a circulatory system for the gases to be synthesized comprising connected passages all of which are of substantially equal cross-sectional area.

14. In an apparatus for synthesizing ammonia, a circulatory system for the gases to be synthesized comprising a series of unobstructed connected passages all of which are substantially equal in cross-sectional area.

In testimony whereof we have affixed our signatures.

EDWIN H. ARNOLD.
WILLIAM T. WAKEFORD.